(12) United States Patent
Vasko et al.

(10) Patent No.: US 7,707,319 B2
(45) Date of Patent: Apr. 27, 2010

(54) NONINVASIVE TESTING OF NETWORK INTERFACE ERROR CODES FOR SAFETY NETWORK

(75) Inventors: David A. Vasko, Macedonia, OH (US); Joseph A. Lenner, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1099 days.

(21) Appl. No.: 10/357,171

(22) Filed: Jan. 31, 2003

(65) Prior Publication Data

US 2003/0145120 A1 Jul. 31, 2003

Related U.S. Application Data

(63) Continuation-in-part of application No. 09/663,824, filed on Sep. 18, 2000, now Pat. No. 6,891,850.

(60) Provisional application No. 60/368,187, filed on Mar. 27, 2002.

(51) Int. Cl.
*G06F 15/16* (2006.01)
(52) U.S. Cl. .............. 709/249; 709/248; 709/224; 709/238; 709/230; 714/100
(58) Field of Classification Search .......... 709/249, 709/224, 248, 238, 230; 714/100
See application file for complete search history.

(56) References Cited

U.S. PATENT DOCUMENTS

| | | | | | |
|---|---|---|---|---|---|
| 4,125,763 | A | * | 11/1978 | Drabing et al. | 714/27 |
| 4,672,529 | A | * | 6/1987 | Kupersmit | 700/1 |
| 5,130,859 | A | * | 7/1992 | Seki et al. | 386/54 |
| 5,577,255 | A | * | 11/1996 | Roemer et al. | 710/264 |
| 5,638,384 | A | * | 6/1997 | Hayashi et al. | 714/752 |
| 5,715,260 | A | * | 2/1998 | Black et al. | 714/798 |
| 5,802,073 | A | * | 9/1998 | Platt | 714/733 |
| 5,831,972 | A | * | 11/1998 | Chen | 370/230 |
| 5,951,707 | A | * | 9/1999 | Christensen et al. | 714/752 |
| 5,983,275 | A | * | 11/1999 | Ecclesine | 709/231 |
| 6,182,163 | B1 | * | 1/2001 | Yamashita et al. | 710/12 |
| 6,209,039 | B1 | * | 3/2001 | Albright et al. | 709/249 |
| 6,226,260 | B1 | * | 5/2001 | McDysan | 370/216 |
| 6,310,884 | B1 | * | 10/2001 | Odenwald, Jr. | 370/412 |
| 6,634,005 | B1 | * | 10/2003 | Lindsay et al. | 714/726 |
| 6,751,213 | B1 | * | 6/2004 | Sun et al. | 370/352 |

FOREIGN PATENT DOCUMENTS

| | | |
|---|---|---|
| DE | 32 32 167 C1 | 8/1982 |
| DE | 199 20 299 A1 | 5/1999 |
| EP | 0 919 888 A1 | 6/1999 |
| WO | WO 00/45562 | 8/2000 |
| WO | WO 01/03361 A1 | 1/2001 |
| WO | WO 01/46765 A1 | 6/2001 |

* cited by examiner

*Primary Examiner*—Thu Nguyen
*Assistant Examiner*—Lan-Dai T Truong
(74) *Attorney, Agent, or Firm*—Boyle Fredrickson LLP; R. Scott Speroff; John M. Miller

(57) ABSTRACT

Error detection codes implemented in standard network interface circuits are enlisted in obtaining high reliability necessary for safety systems by virtual testing of the network interface circuits using background levels of network errors. The frequency of the testing matches the frequency of the network errors.

13 Claims, 3 Drawing Sheets

FIG. 8

| | NETWORK ERRORS | NETWORK CRC | SYSTEM STATUS |
|---|---|---|---|
| 1 | NO | OK | NORMAL OPERATION |
| 2 | NO | FAIL-SHOWS ERROR | SAFETY STATE – VIA WATCHDOG |
| 3 | NO | FAIL-SHOWS NO ERROR | NORMAL OPERATION |
| 4 | YES | OK | SAFETY STATE – VIA WATCHDOG |
| 5 | YES | FAIL-SHOWS ERROR | SAFETY STATE – VIA WATCHDOG |
| 6 | YES | FAIL-SHOWS NO ERROR | SAFETY STATE – VIA SUPPLEMENTAL ERROR TESTING |

NONINVASIVE TESTING OF NETWORK INTERFACE ERROR CODES FOR SAFETY NETWORK

CROSS-REFERENCE TO RELATED APPLICATIONS

This application claims the benefit of provisional application 60/368,187 filed on Mar. 27, 2002 and is a continuation-in-part of U.S. application Ser. No. 09/663,824 filed Sep. 18, 2000 now U.S. Pat. No. 6,891,850 and entitled "Network Independent Safety Protocol for Industrial Controller".

STATEMENT REGARDING FEDERALLY SPONSORED RESEARCH OR DEVELOPMENT

--

BACKGROUND OF THE INVENTION

The present invention relates to industrial controllers used for real-time control of industrial processes, and in particular to high-reliability industrial controllers appropriate for use in devices intended to protect human life and health.

Industrial controllers are special purpose computers used in controlling industrial processes. Under the direction of a stored control program, an industrial controller examines a series of inputs reflecting the status of the controlled process and changes a series of outputs controlling the industrial process. The inputs and outputs may be binary, that is, on or off, or analog, providing a value within a continuous range. The inputs may be obtained from sensors attached to the controlled equipment and the outputs may be signals to actuators on the controlled equipment.

"Safety systems" are systems intended to ensure the safety of humans working in the environment of an industrial process. Such systems may include, for example, the electronics associated with emergency stop buttons, interlock switches and machine lockouts.

Safety systems were originally implemented by hard-wired safety relays but may now be constructed using a special class of high reliability industrial controllers. "High reliability" refers generally to systems that guard against the propagation of erroneous data or signals to a predetermined high level of probability (defined by Safety Certification Standards) by detecting error or fault conditions and signaling their occurrence and/or entering into a predetermined fault state. High reliability systems may be distinguished from high availability systems, however, the present invention may be useful in both such systems and therefore, as used herein, high reliability should not be considered to exclude high availability systems.

Standard protocols for high-speed serial communication networks normally used in industrial control are not sufficiently reliable for high reliability industrial controllers used for safety systems. For this reason, efforts have been undertaken to develop a "safety network protocol" for high-speed serial communication providing greater certainty in the transmission of data. Such safety network protocols employ a variety of error detecting means to ensure that even small errors may be detected at a very high probability and are described in co-pending application Ser. No. 09/663,824 filed 18 Sep. 2000 entitled "Network Independent Safety Protocol for Industrial Controllers" and Ser. No. 09/667,145 filed 21 Sep. 2000 entitled "Safety Network for Industrial Controllers Allowing Installation on Standard Networks", both assigned to the same assignee as the present invention and hereby incorporated by reference.

A common part of many high-speed serial communication networks is a standard network interface circuit (NIC) that handles the low level protocol of the network. Such NICs may make use of one or more specialized integrated circuits produced at high volumes for low cost.

As part of the network protocol, the NIC may attach a cyclic redundancy code (CRC) to messages transmitted on the network. The CRC is functionally derived from the transmitted message and allows the detection of errors introduced into the message during transmission such as from electromagnetic interference. When the message is received, if the message and attached CRC no longer agree, corruption of the message may be inferred.

Ideally, the CRC used by the standard network interface circuit could be relied on in part to meet Safety Certification Standards. Unfortunately, error detection measures relied on under the most common Safety Certification Standards must be capable of being periodically tested. Common NICs do not allow errors to be injected into network messages and/or CRC's to test the receiving network interface circuits.

Accordingly, either the CRC error detecting circuitry of the standard NIC must be disregarded under the Safety Certification Standards or specialized NICs (that allow error injection) must be used. As a practical matter, these choices increase the cost or decrease the performance of the safety network.

BRIEF SUMMARY OF THE INVENTION

The present inventors have recognized that naturally occurring errors on a network can be used, as a practical matter, to test the NIC error detection circuitry if at least one supplemental test of message integrity exists. Failure of the NIC error detection circuitry is indicated by an erroneous message detected by the supplemental test of message. While the frequency of the testing determined by natural errors on the network may be very low, less testing is inherently required for networks with low error rates.

Put another way, if the supplemental test of the message shows an error, either: (1) the NIC error detection circuitry is not working, or (2) cannot keep up with the error rate. In either case, the system should move to a safety state and shut down. On the other hand, if the supplemental test of the message shows no error, either: (1) the NIC error detection circuitry is working, or (2) the natural error rate of the network is so low as to not be an issue. In either case, the system can continue to run normally.

By providing an effective test of NIC error detection circuitry, the present invention allows NIC error detection circuitry to be enlisted in meeting Safety Certification Standards for the network.

Specifically, the present invention provides a safety communication system having a network transmitting messages, where the messages have data and error detection codes derived from the data. A network interface connectable to the network receives the messages and includes a network error testing circuit reading the error detection codes of the messages to detect errors in the data of the messages. A supplemental error testing is included that communicates with the network interface to also receive the data of received messages. The supplemental error detecting means independently detects errors in at least a portion of the message.

Thus, it is one object of the invention to provide a method of detecting errors in a standard network interface by using background network message errors, thus providing an implicit testing of the network interface without special testing circuitry.

The supplemental error testing means may be a second error detection code embedded in the data or may be a second copy of the data transmitted over the network.

Thus, it is another object of the invention to provide flexibility with respect to how the supplemental error testing is accomplished.

The network error testing means may be implemented in hardware.

Thus, it is an object of the invention to allow the invention to be used with standard hardware network interface circuits where errors may not be injected into the network.

The network interface may block messages from the supplemental error testing means when an error is detected in the message.

Thus, it is another object of the invention to provide a method of testing the network interface when erroneous messages are blocked as is true with many standard hardware network interface circuits.

The network may have a protocol selected from the group consisting of Ethernet, DeviceNet, ControlNet, Firewire or FieldBus.

Thus, it is another object of the invention to provide a system that works with common networks used for industrial control.

The network may be a serial network.

Thus, it is another object of the invention to provide a system that may be used for common industrial control networks and backplanes which use serial network protocols.

The safety communication system may revert to a safety state when: (1) a single error is detected by the supplemental error testing means, or (2) when a predetermined number of errors are detected by the supplemental error testing means or (3) if a rate of errors exceeds a predetermined amount.

Thus, it is another object of the invention to provide flexibility in selecting between the competing goals of high reliability and high availability.

These particular objects and advantages described above may apply to only some embodiments of the invention falling within the claims and thus do not define the scope of the invention.

BRIEF DESCRIPTION OF THE DRAWINGS

FIG. 8 is a chart showing combinations of network errors and failure states of the NIC illustrating the effective testing of the NIC by network errors.

DETAILED DESCRIPTION OF THE PREFERRED EMBODIMENT

The present invention can be part of a "safety system" used to protect human life and limb in the industrial environment. Nevertheless, the term "safety" as used herein is not a representation that the present invention will make an industrial process safe or that other systems will produce unsafe operation. Safety in an industrial process depends on a wide variety of factors outside the scope of the present invention, including: design of the safety system, installation and maintenance of the components of the safety system, and cooperation and training of individuals using the safety system. Although the present invention is intended to be highly reliable, all physical systems are susceptible to failure and provision must be made for such failure.

Basic System Hardware

Figure 1:
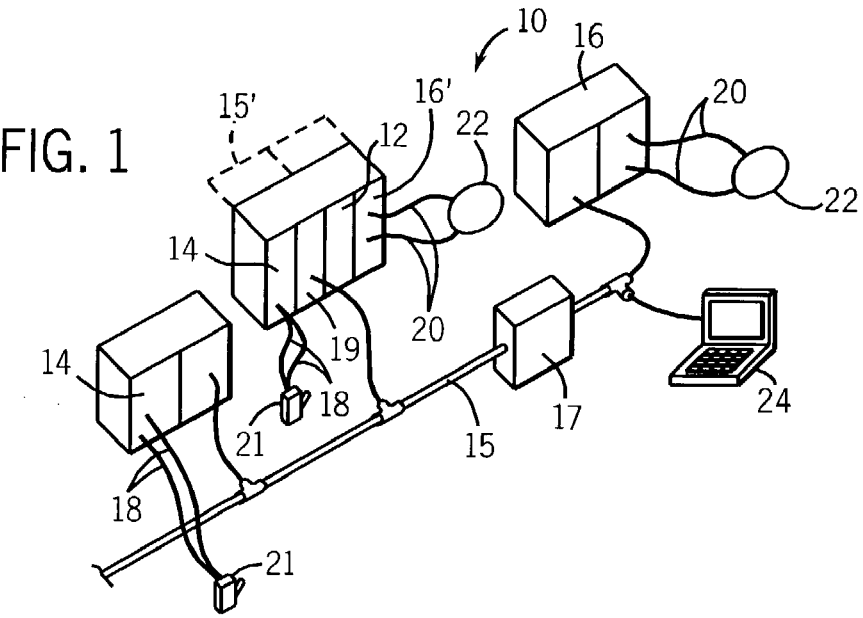
FIG. 1 is a perspective view of a simplified industrial controller using a standard serial communication network to link a central controller with remote input/output circuits and using a network equivalent backplane to link the central controller with a local input/output circuit.

Referring now to FIG. 1, a high reliability industrial control system 10 for implementing a safety system with the present invention includes a central controller 12 communicating on an external serial network 15 with an input module 14 and an output module 16. Alternatively, the central controller 12 may communicate via a backplane serial network 15' running internally within the central controller 12 with an internal input module 14 and an output module 16.

Preferably, external and/or backplane serial networks 15 and 15' are standard single or multiple conductors (parallel) copper media but may include fiber optic, wireless communication technology, or other well-known alternatives. More generally, the serial network 15, 15' may use standard and commonly available high-speed serial protocols including but not limited to: Ethernet, DeviceNet, ControlNet, Firewire or FieldBus.

The external serial network 15 may optionally include a standard bridge 17 translating between different of the above standard or other protocols. A similar function may be performed by a network module 19 being part of the central controller 12 but with respect to translating between the external and backplane serial networks 15 and 15'. Also connected to the external serial network 15 is a standard computer which may be used as a configuration terminal 24 so as to configure the control system as may be required.

Input module 14 may accept input signals 18 on like designated lines, which after receipt by the input module 14, are communicated over the serial network 15 (for a remote input module 14), or over the backplane serial network 15' (for an internal input module 14) to the central controller 12. The input signals 18 may come from a switch 21 which may be any of the various devices producing safety input signals including, but not limited to, emergency stop switches, interlock switches, light curtains and other proximity detectors.

At the central controller 12 input signals 18 may be processed under a control program implementing a safety system such as a machine lockout or an emergency stop and further signals may be communicated to the remote output module 16 over the serial network 15, or to the internal output module 16' over the backplane serial network 15' either of which may produce output signals 20 on like designated lines to actuator 22. The actuator 22 may be a relay, solenoid, motor, enunciator, lamp, or other device depending on the safety function.

The invention contemplates much more complex systems and this simplified system of FIG. 1 will be used for the following description for clarity.

Figure 2:
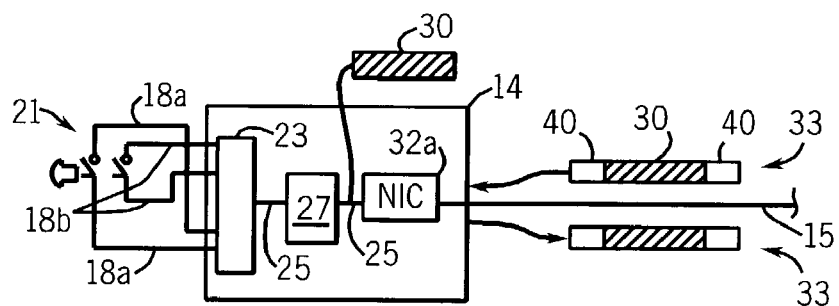
FIG. 2 is a schematic block diagram of an input circuit (either remote or local) sending and receiving data having an appended CRC code by a network interface circuit (NIC) on a network and/or a network equivalent backplane.

Referring now to FIG. 2, the switch 21 may produce input signals 18a and 18b (duplicated to promote reliability) received by interface circuitry 23 of a remote input module 14 and communicating over an internal bus 25 with a processor 27. The processor 27 running an internal program that may vary according to the function of the remote input module 14, compares the input signals 18a and 18b and prepares data 30 based on the input signals, for example, indicating the state of the switch 21. This data 30 is provided through a network interface circuit (NIC) 32a for the particular network protocol. For example, the NIC may be an Ethernet interface providing hardware and firmware (henceforth collectively referred to as hardware) for managing the transmission of the data 30 on the external serial network 15.

The NIC 32a packages the data 30 in a header and/or footer 40 to form a message 33 as is required by the particular network protocol and is well understood in the art. The content of the network header and footer 40 are not critical to the invention and will vary according to the protocol of the selected network except that it shall include an error detection code such as a cyclic redundancy code (CRC) well known in the art and used for most serial network protocols. The CRC (shown here in the footer 40) provides a compressed representation of the data 30 that when compared with the data 30 allow detection of and, in some cases, correction of errors in the data 30 caused for example by electrical interference with the signals on the networks 15 and/or 15'. Such interference may switch a binary representation of a "one" to a "zero" or vice versa.

Figure 3:
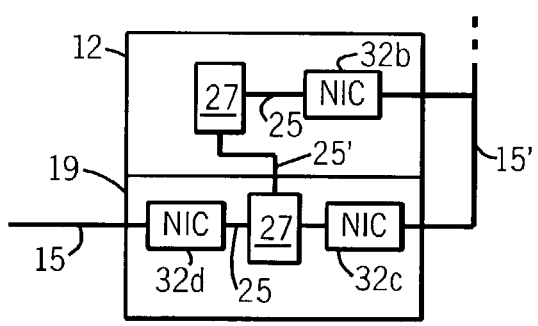
FIG. 3 is a figure similar to that of FIG. 2, showing the central controller communicating via an NIC with the network and a network equivalent backplane.

Referring now to FIG. 3, the central controller 12 may also include a processor 27 communicating on an internal bus 25 with an NIC 32b operating similarly to NIC 32a but using the protocol of the backplane serial network 15'. Data 30 (not shown) may be received by the processor 27 or transmitted by the processor 27 via the NIC 32b on the backplane 15' where it is encapsulated in a manner similar but not necessarily identical to that performed by NIC 32a.

The backplane serial network 15' may communicate, in one example, with an internal input module 14, similar to that described above, having an NIC 32c similar to NIC 32b, or with the network module 19, communicating via an internal bus 25' with NIC 32c (similar to NIC 32b) attached to the backplane 15' and with NIC 32d attached to the serial network 15'. Network module 19 thus provides a path between the networks 15 and 15'.

Figure 4:
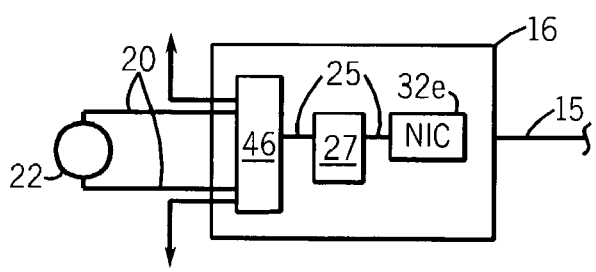
FIG. 4 is a figure similar to that of FIGS. 2 and 3, showing an output circuit (either remote or local) communicating via an NIC with the network and a network equivalent backplane.

Referring to FIG. 4, the output module 16 is similar to the input module 14 described above including an NIC 32e attached to external serial network 15 and communicating via an internal bus 25 with a processor 27 which communicates with output interface circuit 46, the latter providing output signals 20 to actuator 22. Generally, NICs 32a-32e may be obtained inexpensively as they represent standard parts designed for particular network protocols.

Safety Message Format

Figure 5:
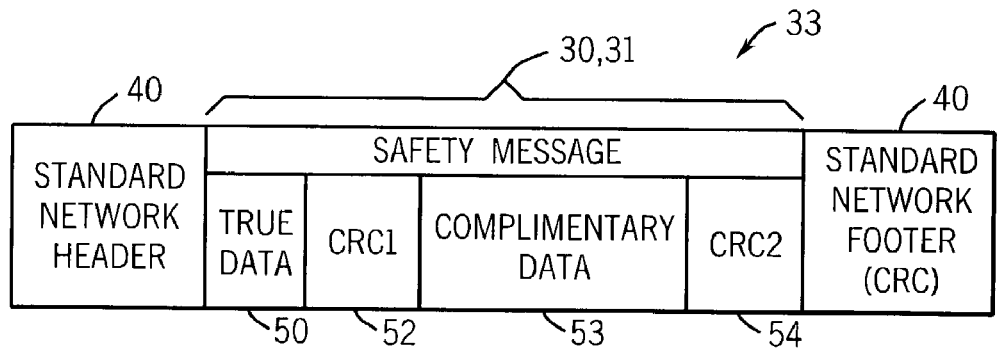
FIG. 5 is a diagram of the data sent on the network per FIG. 2, having a safety message having an appended CRC added by the NIC.

Referring now to FIG. 5, the data 30 transmitted on external or backplane serial networks 15 or 15' as described above may be a safety message 31. In this case, the CRC of the footer 40 covers the data 30 of the safety message 31.

The safety message 31 includes additional error detection features that may be added by software running in the processors 27 or additional specialized hardware. In the preferred embodiment, data 30 of the safety message 31 includes two copies of the information being transmitted: true data 50 being the information and complementary data 53 equal to the true data after inversion changes its ones to zeros and zeros to ones. The true data 50 has a corresponding error detection code 52 (typically being a cyclic redundancy code (CRC)) for detecting errors in the true data 50. Likewise, the complementary data 53 has a supplemental error detection code 54 (also preferably but not necessarily a CRC) associated with it.

Additional data may be incorporated into the safety message 31, for example, time stamping and message ID information outside the scope of the present invention.

As described, the data 30 of the safety message 31 provides two distinct supplemental methods of detection of error in the true data 50. The first is the error detection code 52 and the second is the complementary data 53 either of which may compared to the true data 50 to detect errors introduced into the true data 50 during its transmission on the external serial network 15 or backplane serial network 15'. As will also be described, this supplementary error detection allows for the testing of the NICs 32a-32e without modification of these circuits and despite the inability of these circuits to inject erroneous message data into the networks 15, 15' to test other NICs.

Supplemental Error Testing

Figure 6:
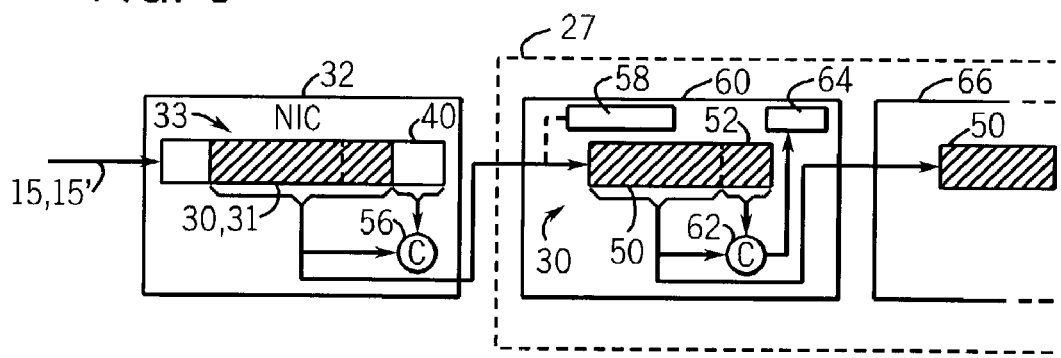
FIG. 6 is a flow diagram showing receipt of the message of FIG. 5 by the NIC for first level of error detection followed by a second level of error detection by a safety CRC and finally a passing of the contained message data to a safety application.

Referring now to FIG. 6, in operation, a message 33 may be received by any of NIC 32a-32e, which are shown in FIGS. 2-4 and represented generally in FIG. 6 as NIC 32, over serial network 15 or 15'. Upon receipt, the CRC of the footer 40 is compared with the data 30 of the message 33 via CRC evaluator 56. The CRC evaluator 56 determines whether the CRC in footer 40 expresses the correct functional relationship with respect to the data of the data 30. Such comparison is well known in the art and varies depending on the number of CRC bits used in the network protocol and the algorithm used.

If there is a match between the data 30 and CRC of the footer 40, the data 30 is forwarded (normally to the processor of the respective device) with the headers and footers 40 removed. The processor 27 will further evaluate the data 30 using the safety protocol to be described in a supplemental error-testing step. Generally, if there is no match between the data 30 and the CRC, the data 30 is not forwarded. Notice of the error may or may not be generated.

When the data 30 is received by the processor 27, it tolls a watchdog timer 58, which indicates whether a message 33 is being received regularly for a particular connection. Generally the watchdog time value may be set by the configuration terminal 24 in setting up the network and is realized by a safety protocol 60 running in software in the processor 27. The purpose of the watchdog timer 58 is to detect errors that cause failure of the data 30 to be received. Such errors may include loss of the external or backplane serial networks 15 or 15' or undue delay in the transmission of messages or data error caught by the NICs.

Assuming that the data 30 has arrived within the scheduled time, the integrity of the true data 50 may be determined by evaluation of the error detection code 52 via CRC evaluator 62 similar to CRC evaluator 56 described above but as a supplemental error-testing step. If there is no error in true data 50, the true data 50 may be passed on to the control application 66 also typically being implemented as software within the processor 27.

In event of an error in the true data 50, the true data 50 is not forwarded to the application 66 but in a first embodiment the safety protocol 60 enters a safety state, generally being a shutting down of the high reliability industrial control system 10 according to predefined safety state inputs and outputs.

In an alternative embodiment, a tradeoff between high reliability and high availability can be provided by forwarding indications of errors in true data 50 to a counter 64 providing, in effect, an integration of the error rate with respect to the number of messages received. In one example, the counter 64 may have an output value bounded at zero and seventeen. In this case, each safety message 31 with a detected error in the true data 50 (as determined by the safety protocol) may cause the addition of eight to the counter 64. Safety messages received without errors in the true data 50 may subtract one from the error counter. The counter 64 may cause a safety state invocation when the counter value equals or exceeds seventeen. A rate of errors above a certain amount is thus used to invoke the safety state.

Alternatively, the subtraction step may be eliminated and the safety state may be invoked with a predetermined number of errors rather than a rate or a time-based rate may be used in which the subtraction is performed on a regular time interval.

In either case, adjusting the ratio between the incrementing value and decrementing value sets the number of errors that may be tolerated.

Figure 7:
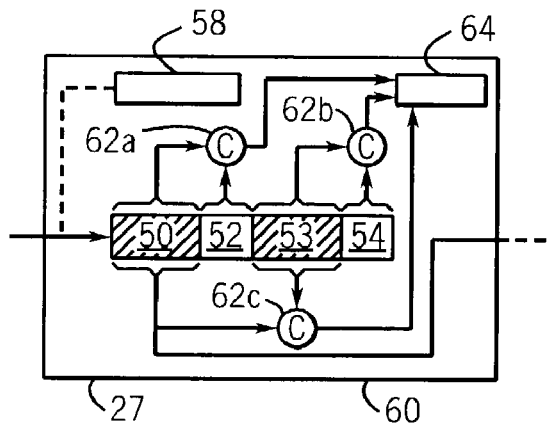
FIG. 7 is a portion of the flow diagram of FIG. 6 showing an alternative second level of error detection by use of complementary data.

Referring now to FIG. 7, as mentioned, the safety message 31 includes true data 50 as well as complementary data 53. Accordingly, the supplemental error-testing step may consist of a comparison of the true data 50 to the complementary data 53. Specifically, multiple evaluations may be performed: (1) CRC evaluator 62a may compare the true data 50 against error detection code 52, (2) CRC evaluator 62b may compare complementary data 53 against error detection code 54, and (3) evaluator 62c may compare true data 50 and complementary data 53.

Each of these comparisons may detect errors in the true data 50. Detected errors may be forwarded to counter 64 as has been described above or used directly to invoke the safety state. Importantly, the present invention contemplates that a second detection of errors in true data 50 as opposed to the initial detection performed by the CRC evaluator 56 of the NICs 32a-32e may be performed but this second detection of errors need not be a CRC check of true data 50 by error detection code 52.

The significance of the supplemental error testing of true data 50 beyond that provided by the NICs 32a-32e and its CRC code of footer 40 is that it allows testing of the NICs 32a-32e not by the introduction erroneous test messages by the NICs 32a-32e, but by natural background errors occurring for reasons of external interference on external or backplane serial networks 15 or 15'. The frequency of this testing conforms exactly to the error rate on the network with networks 15 or 15' having high error rates providing more frequent "effective" testing and networks having low error rates providing less frequent testing, which is acceptable as will be explained.

Effective Testing of NIC

Referring to FIG. 8, six different error states of the network 15 or 15' can occur. The safety protocol 60 responds in different ways as will be described.

Per row one, there may be no network errors and the NIC CRC may be working properly. In this case, safety protocol 60 will continue with normal operations as is desired.

In row two, there may be no network errors but the NIC CRC may have failed in a manner that shows errors. In this case, the safety protocol 60 will invoke the safety state with the error state detected via the watchdog timer 58 indicating that no safety message 31 has been received as a result of the NICs preventing the transmission of the supposed erroneous data. Note that even without the watchdog timer 58, no erroneous data will be transmitted comporting with the need for high reliability in a safety system.

In row three, there may be no network errors and the NIC CRC may have failed in a manner to show no errors. In this case, the safety protocol 60 allows normal operation as no fault is apparent, but this is acceptable given the fact that correct data is in fact being received.

At row four, there may be network errors and the NIC CRC may be working, in which case, no message is passed from the NIC to the safety protocol 60 which causes the safety state to be entered as triggered by the watchdog timer 58 which indicates that messages have not been received in a timely fashion because of the operation of the NIC CRC in blocking erroneous messages.

At row five, there may be network errors but a failure in the NIC CRC that nevertheless shows errors. Again, the safety protocol 60 causes the safety state to be entered as triggered by the watchdog timer 58.

In row six, there may be network errors, but the failure of the NIC CRC shows no errors. This is the most critical situation, for if the NICs 32a-32e are to be relied upon for supporting the reliability of the system as a safety system, such errors must not pass unnoticed. In this case, the safety protocol 60 causes the safety state to be entered as triggered by detection of the errors by the secondary error testing provided by one or more of the system of CRC evaluator 62 or 62a-c. In this last state, the NICs 32a-32e are effectively tested by the natural network errors.

The chart of FIG. 8 clearly indicates that failure of the CRC may be detected in all cases where that failure is critical allowing it to be relied upon for the purpose of safety certification.

It is specifically intended that the present invention not be limited to the embodiments and illustrations contained herein, but include modified forms of those embodiments including portions of the embodiments and combinations of elements of different embodiments as come within the scope of the plain meaning of the following claims.

We claim:

1. A safety communications system comprising:
   a network for transmitting messages according to a network protocol each message has at least one of a header and a footer, the message includes a first error detection code, and a data segment, the data segment includes data and a second error detection code, the first error detection code derived from the data segment according to the network protocol;
   a network interface connectable to the network to receive the messages, the network interface including a network error testing means reading the first error detection codes of the messages to detect errors in the data segment of messages; and
   a supplemental error testing means communicating with the network interface to receive the data segment of received messages, the supplemental error testing means using the second error detection code to independently detect errors in at least a portion of the data of received messages;
   the supplemental error testing means monitors the message data segment passed by the network interface to assess the correct operation of the network error testing means without the use of dedicated test signals but by using a background error naturally occurring in the messages on the network to provide an indication of an error in the network interface;

the supplemental error testing means is a comparator which compares the data of data segment against the second error detection code embedded in the data segment to detect errors not identified by the network error testing means;

the second error detection code is at least one of a checksum of the data, a complementary copy of the data, and a checksum of the complementary copy of the data and the supplemental error testing means compares the data against the second error detection code.

2. The safety communications system of claim 1 wherein the network error testing means of the network interface is implemented in hardware.

3. The safety communications system of claim 1 wherein the network error testing means removes the first error detection codes derived from the data segment.

4. The safety communications system of claim 1 wherein the network interface blocks messages from the supplemental error testing means when an error is detected in the message by the network error testing means.

5. The safety communications system of claim 1 wherein the network follows a protocol selected from the group consisting of: Ethernet, DeviceNet, ControlNet, Firewire or FieldBus.

6. The safety communications system of claim 1 wherein the network is a serial network.

7. The safety communications system of claim 1 wherein the standard network is a parallel bus.

8. The safety communications system of claim 1 including an error monitor receiving the indication of error detected by the supplemental error testing means to put the safety communications system in a safety state when an error is detected in the portion of the data by the supplemental error testing means.

9. The safety communications system of claim 1 including an error monitor having a counter receiving an indication of error detected by the supplemental error testing means to put the safety communications system in a safety state when a predetermined number of errors greater than one are detected in the portion of the data by the supplemental error testing means.

10. The safety communications system of claim 1 including an error monitor having a counter receiving an indication of error detected by the supplemental error testing means to put the safety communications system in a safety state when a predetermined rate of errors is detected in the portion of the data by the supplemental error testing means.

11. The safety communications system of claim 10 wherein the error monitor is a counter adding a predetermined value to the counter for each message having an error detected by the supplemental error testing and subtracting a predetermined value from the counter for each message without an error and wherein a counter value above a predetermined bound puts the safety communications system in a safety state.

12. The error counter of claim 11 wherein at least one of the predetermined value added to the counter, the predetermined value subtracted from the counter and the predetermined bound may be changed by a user.

13. The safety communications system of claim 1 including a watchdog timer monitoring data received by the supplemental error testing means to put the safety communications system in a safety state when data is not received by the supplemental error testing means according to a predefined time interval.

* * * * *